United States Patent [19]
Kurakake et al.

[11] Patent Number: 5,583,409
[45] Date of Patent: Dec. 10, 1996

[54] NUMERICAL CONTROL APPARATUS AND METHOD FOR CONTROLLING A MACHINE

[75] Inventors: Mitsuo Kurakake, Hino; Yoshiaki Ikeda, Minamitsuru-gun, both of Japan

[73] Assignee: Fanuc Ltd, Minamitsuru-gun, Japan

[21] Appl. No.: 531,203

[22] Filed: Sep. 19, 1995

Related U.S. Application Data

[63] Continuation of Ser. No. 211,668, Apr. 14, 1994, abandoned.

[30] Foreign Application Priority Data

Aug. 31, 1992 [JP] Japan ................................ 4-231836

[51] Int. Cl.⁶ ..................... G05B 19/4093; G05B 19/41
[52] U.S. Cl. ........................ 318/569; 318/573; 318/594; 364/474.03; 364/474.16; 364/474.26; 364/474.29
[58] Field of Search ..................... 318/569, 570, 318/571, 572, 573, 577, 594, 599, 600, 603, 574, 575; 364/474.01, 474.02, 474.03, 474.11, 474.12, 474.16, 474.17, 474.22, 474.23, 474.24, 474.25, 474.26, 474.28, 474.29

[56] References Cited

U.S. PATENT DOCUMENTS

| | | |
|---|---|---|
| 3,581,045 | 5/1971 | Panschow et al. . |
| 3,634,661 | 1/1972 | Fitzner . |
| 3,783,253 | 1/1974 | Anderson et al. . |
| 3,854,353 | 12/1974 | Cutler . |
| 4,010,356 | 3/1977 | Evans et al. . |
| 4,152,765 | 5/1979 | Weber . |
| 4,179,602 | 12/1979 | Maruyama et al. ............. 219/125.1 |
| 4,445,182 | 4/1984 | Morita et al. . |
| 4,503,493 | 3/1985 | Burkhardt et al. . |
| 4,535,408 | 8/1985 | Kishi et al. . |
| 4,649,252 | 3/1987 | Obara . |
| 4,692,873 | 9/1987 | Kishi et al. . |
| 4,713,517 | 12/1987 | Kinoshita . |
| 4,739,489 | 4/1988 | Kishi et al. . |
| 4,978,901 | 12/1990 | Hirai .................................. 318/600 |
| 5,148,372 | 9/1992 | Maiocco et al. . |
| 5,210,478 | 5/1993 | Sasaki et al. . |
| 5,255,201 | 10/1993 | Maeda . |
| 5,278,479 | 1/1994 | Seki et al. . |
| 5,282,143 | 1/1994 | Shirai et al. . |
| 5,315,789 | 5/1994 | Takashi . |

FOREIGN PATENT DOCUMENTS

| | | |
|---|---|---|
| 62-14845 | 4/1987 | Japan . |
| 63-263502 | 10/1988 | Japan . |
| 1-287707 | 11/1989 | Japan . |
| 2054199 | 2/1991 | United Kingdom . |
| 2094023 | 9/1992 | United Kingdom . |

OTHER PUBLICATIONS

Technische Rundschau, vol. 80, No. 38, 16 Sep. 1988, Bern, CH, pp. 36–39; XP000110997, Hans B. Kief, "Mehr Vorteile durch Werkstattprogrammierung".

*Primary Examiner*—Bentsu Ro
*Attorney, Agent, or Firm*—Staas & Halsey

[57] ABSTRACT

A numerical control apparatus allows a portion of a prototype or the like to be easily machined without an operator being concerned with a coordinate system, origins, and other data. A guidance function executing unit displays guidance information on a display unit. According to the displayed guidance information, the operator enters machining commands using a keyboard, etc. A pulse distributing unit sends present positions from present position registers to the guidance function executing unit. The guidance function executing unit calculates a movement command from command values commanded by the operator and the present positions, and sends the calculated movement command to the pulse distributing unit, which outputs distributed pulses to drive the machine tool.

13 Claims, 7 Drawing Sheets

- ☐ LINEAR MACHINING
- ☐ OBLIQUE LINEAR MACHINING
- ☐ ARCUATE MACHINING
- ☐ FULL-CIRCLE MACHINING
- ☐ CORNER R MACHINING
- ☐ CORNER C MACHINING
- ☐ RECESS MACHINING
- ☐ PLANE MACHINING
- ☐ SIDE MACHINING
- ☐ POCKET MACHINING
- ☐ BORE MACHINING

NUMERICAL CONTROL APPARATUS AND METHOD FOR CONTROLLING A MACHINE

This application is a continuation of application Ser. No. 08/211,668, filed Apr. 14, 1994, now abandoned.

TECHNICAL FIELD

The present invention relates to a numerical control apparatus and method for controlling a machine tool, and more particularly to a numerical control apparatus and method for controlling a machine tool which machines prototypes or the like.

BACKGROUND ART

Advances in the technology of numerically controlled machine tools have been so great that these numerically controlled machine tools can machine workpieces of complex shape at high speed with precision. At present, workpieces of complex shape cannot be machined without numerically controlled machine tools.

To generate machining programs, there are widely used interactive numerical control apparatuses which comprise a numerical control apparatus with an interactive program generating function, and an automatic programming apparatus for simply generating complex machining programs.

In the use of such a numerical a control apparatus, it is necessary to accurately define machine coordinates, a machine origin, program coordinates, a machining origin, and other data for generating strict machining programs. The interactive numerical control apparatus and the automatic programming apparatus can be used to machine a number of workpieces. However, a portion of a machining process for producing a prototype or a model is carried out solely at the discretion of the operator since no definite workpiece shapes are defined. Therefore, general-purpose milling machines, lathes, or the like are used to machine prototypes or models.

Problems of general-purpose machine tools are that the number of available operators who can handle general-purpose machine tools is becoming smaller, and it is difficult for the general-purpose machine tools to carry out oblique linear machining, arcuate machining, or the like though they can effect linear machining without any problem.

If, on the other hand, a general numerically controlled machine tool is used to machine a prototype or a model, then it is necessary to accurately define machine coordinates, a machine origin, program coordinates, a machining origin, and other data. While it is not impossible to define those data, the required programming process is too time-consuming and troublesome for machining a portion of a single workpiece.

DISCLOSURE OF THE INVENTION

In view of the above problems of the conventional practice, it is an object of the present invention to provide a numerical control apparatus capable of easily carrying out simple machining of a prototype or the like with a general-purpose machine tool.

To achieve the above object, there is provided in accordance with the present invention a numerical control apparatus for controlling a machine tool having at least two axes, comprising guidance function executing means for outputting guidance information with respect to a selected machining process, recognizing present positions of the respective axes, and outputting movement commands for the respective axes from command values for the respective axes and the present positions of the respective axes, a guidance display unit for displaying the guidance information, and pulse distributing means for distributing pulses for the movement commands, the pulse distributing means having a memory for storing the present positions of the respective axes.

The guidance function executing means outputs guidance information with respect to a selected machining process, e.g., a corner R machining process. The guidance information is displayed on the guidance display unit. The operator enters command values for the respective axes in accordance with the guidance information.

The guidance function executing means calculates a movement command from recognized present positions of the respective axes and the command values for the respective axes, and outputs the calculated movement command. The pulse distributing means distributes pulses for the movement command.

The numerical control apparatus allows a portion of a prototype or the like to be easily machined.

BRIEF DESCRIPTION OF THE DRAWINGS

FIG. 3 is a view showing a screen display image for selecting guidance functions;

BEST MODE FOR CARRYING OUT THE INVENTION

An embodiment of the present invention will hereinafter be described below with reference to the drawings.

Figure 1:
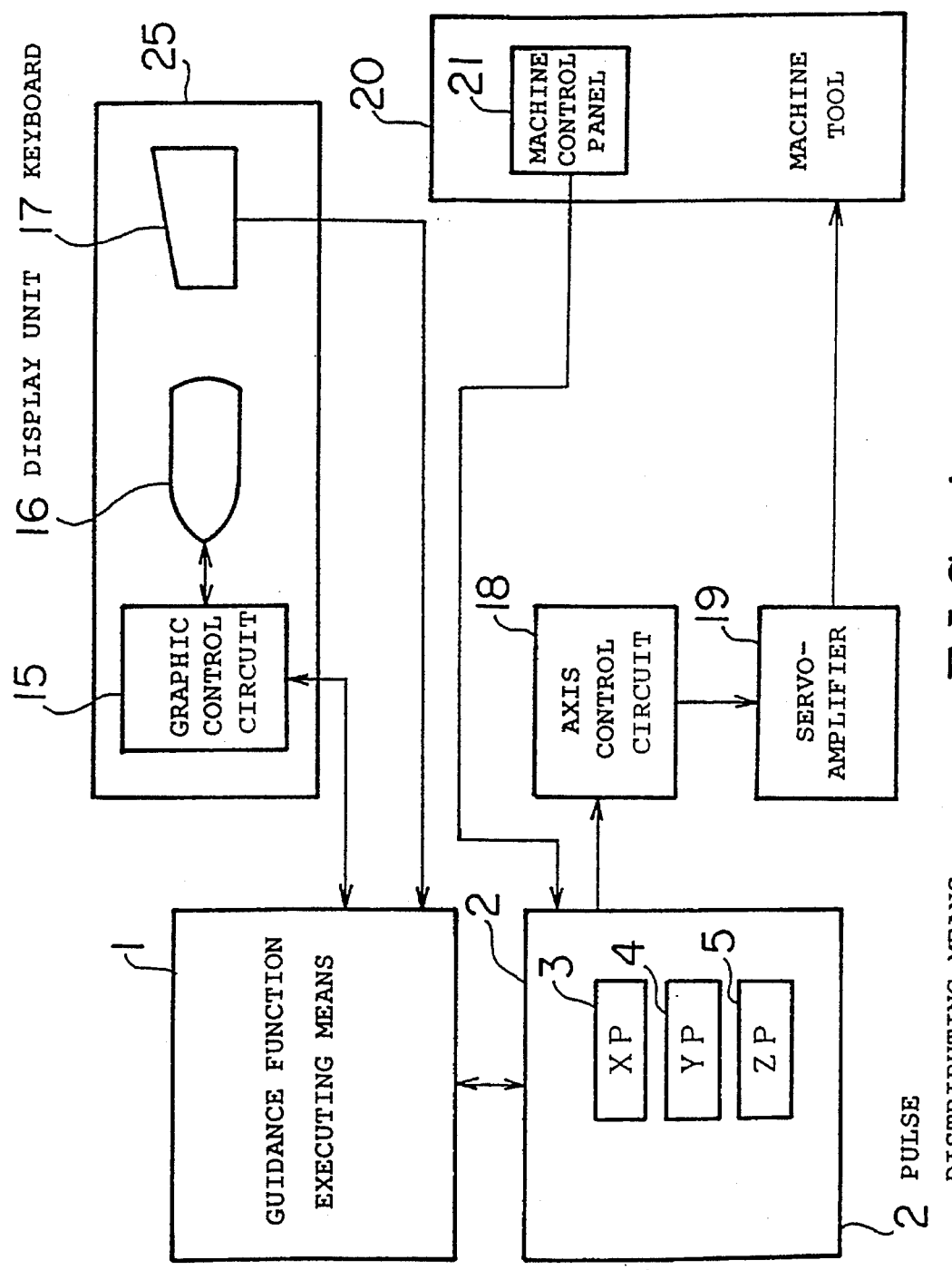
FIG. 1 is a schematic diagram of a numerical control apparatus according to the present invention.

FIG. 1 schematically illustrates a numerical control apparatus according to the present invention. The numerical control apparatus includes a guidance function executing means 1 operable by a keyboard 17 for generating guidance information corresponding to a machining process and sending the guidance information to a graphic control circuit 15, which displays the guidance information on a display unit 16. Machining processes include an oblique linear machining process, a corner R machining process, etc., and will be described in detail later on.

The guidance function executing means 1 first recognizes a reference position. Specifically, when the recognition of such a reference position is commanded by position buttons for respective axes on a machine control panel 21 of a machine tool 20, the guidance function executing means 1 receives present positions (XP, YP, ZP) of the respective axes from a present position register 3 (X-axis), a present position register 4 (Y-axis), and a present position register 5 (Z-axis) for the respective axes of pulse distributing means 2. Then, the guidance function executing means 1 subtracts the present positions of the respective axes from a commanded final position, and outputs movement commands for the respective axes to the pulse distributing means 2.

In accordance with the movement commands, the pulse distributing means 2 distributes pulses, and outputs the distributed pulses to an axis control circuit 18, which actually comprises three axis control circuits. In response to the distributed pulses, the axis control circuit 18 generates speed commands for the respective axes, and supplies the speed commands to a servoamplifier 19. The servoamplifier 19 energizes servomotors of the machine tool 20 for controlling the machine tool 20.

The guidance function executing means 1 and the pulse distributing means 2 are software-implemented as described later on.

Figure 2:
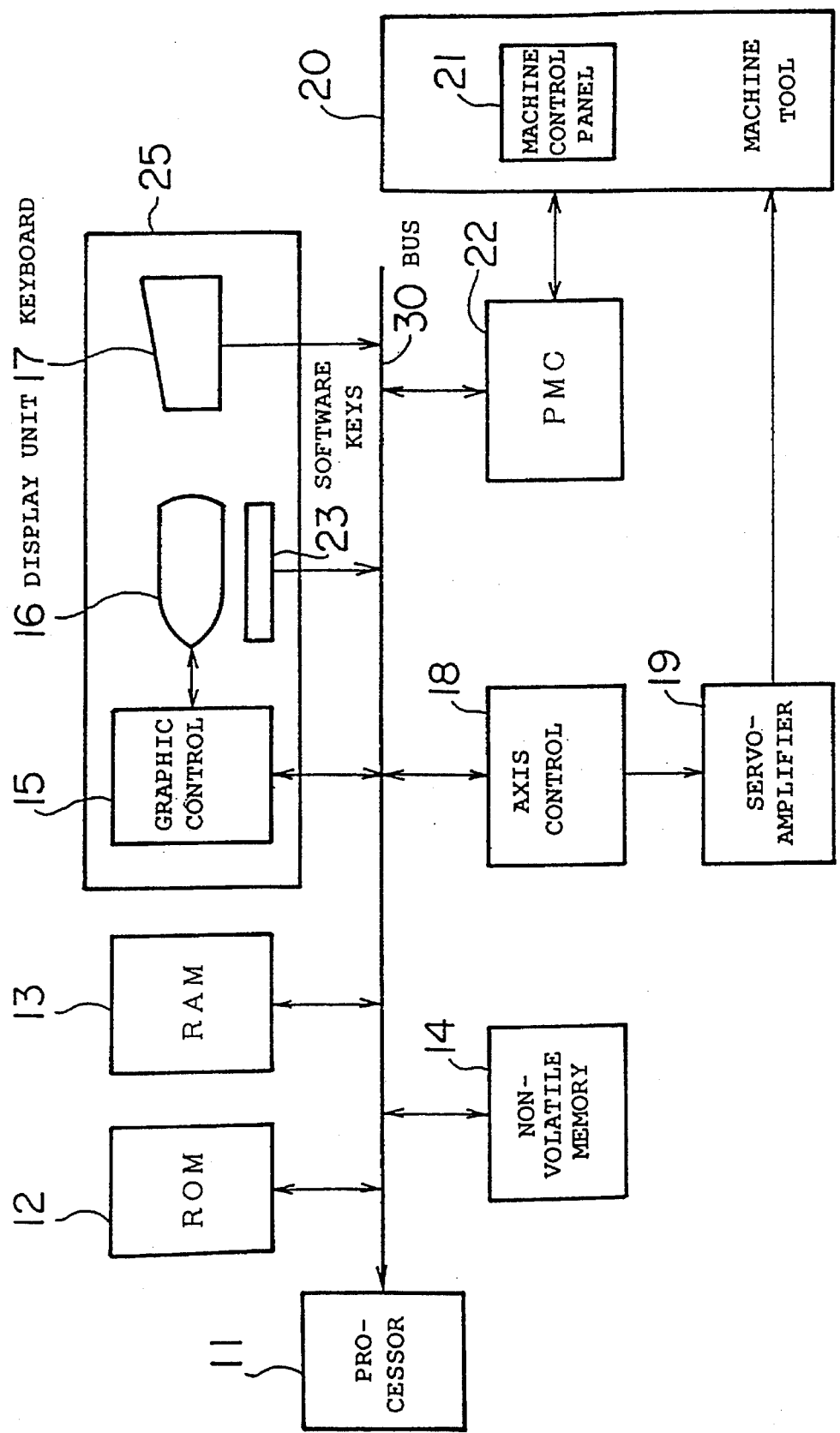
FIG. 2 is a block diagram of a hardware arrangement of the numerical control apparatus according to the present invention.

FIG. 2 shows in block form a hardware arrangement of the numerical control apparatus according to the present invention.

A processor 11 controls the numerical control apparatus in its entirety in accordance with a system program stored in a ROM 12. The guidance function executing means 1 and the pulse distributing means 2 shown in FIG. 1 are functions that are performed by the processor 11 in accordance with the system program stored in the ROM 12. The ROM 12 may comprise an EPROM or an EEPROM. A RAM 13, which may comprise an SRAM or the like, stores temporary data such as input and output signals. A nonvolatile memory 14 comprises a CMOS backed up by a battery (not shown), and stores various data such as parameters, machining programs, etc., that are to be retained after the power supply is turned off.

The graphic control circuit 15 converts guidance information into signals that can be displayed, and supplies the signals to the display unit 16. Details of the guidance information will be described later on. The display unit 16 may comprise a CRT or a liquid crystal display panel. When supplied with the movement commands for the respective axes from the processor 11, the axis control circuit 18 (three axis control circuits) outputs the movement commands for the respective axes to the servoamplifier 19 (three servoamplifiers for the respective axes). In response to the supplied movement commands, the servoamplifier 19 energizes the servomotors (not shown) of the machine tool 20. The components described above are interconnected by a bus 30.

A PMC (programmable controller) 22 receives a T function signal (tool selection command) through the bus 30 when a machining program is executed. The PMC 22 processes the received T function signal according to a sequence program, and outputs the processed signal as an operation command to control the machine tool 20. If the numerical control apparatus is of the interactive type, then the PMC 22 receives a status signal from the machine tool 20, processes the status signal according to sequential processing, and transfers an input signal required by the processor 11 through the bus 30.

To the bus 30, there are also connected software keys 23 whose function varies depending on the system program or the like. The software keys 23, the display unit 16, and the key board 17 are mounted on a CRT/MDI panel 25.

The guidance functions will be described in detail below. To perform a guidance function, the operator selects a screen display image for selecting the guidance function as shown in FIG. 3. The screen display image for selecting the guidance function has various machining processes including linear machining, oblique linear machining, arcuate machining, full-circle machining, corner R machining, corner C machining, recess machining, plane machining, side machining, pocket machining, and bore machining. The operator selects one of the types of machining processes which is to be used, with the software keys 23 shown in FIG. 2. The procedure for selecting one of the machining processes will not be described as it is well known in the art as a function of a conventional numerical control apparatus.

Figure 4:
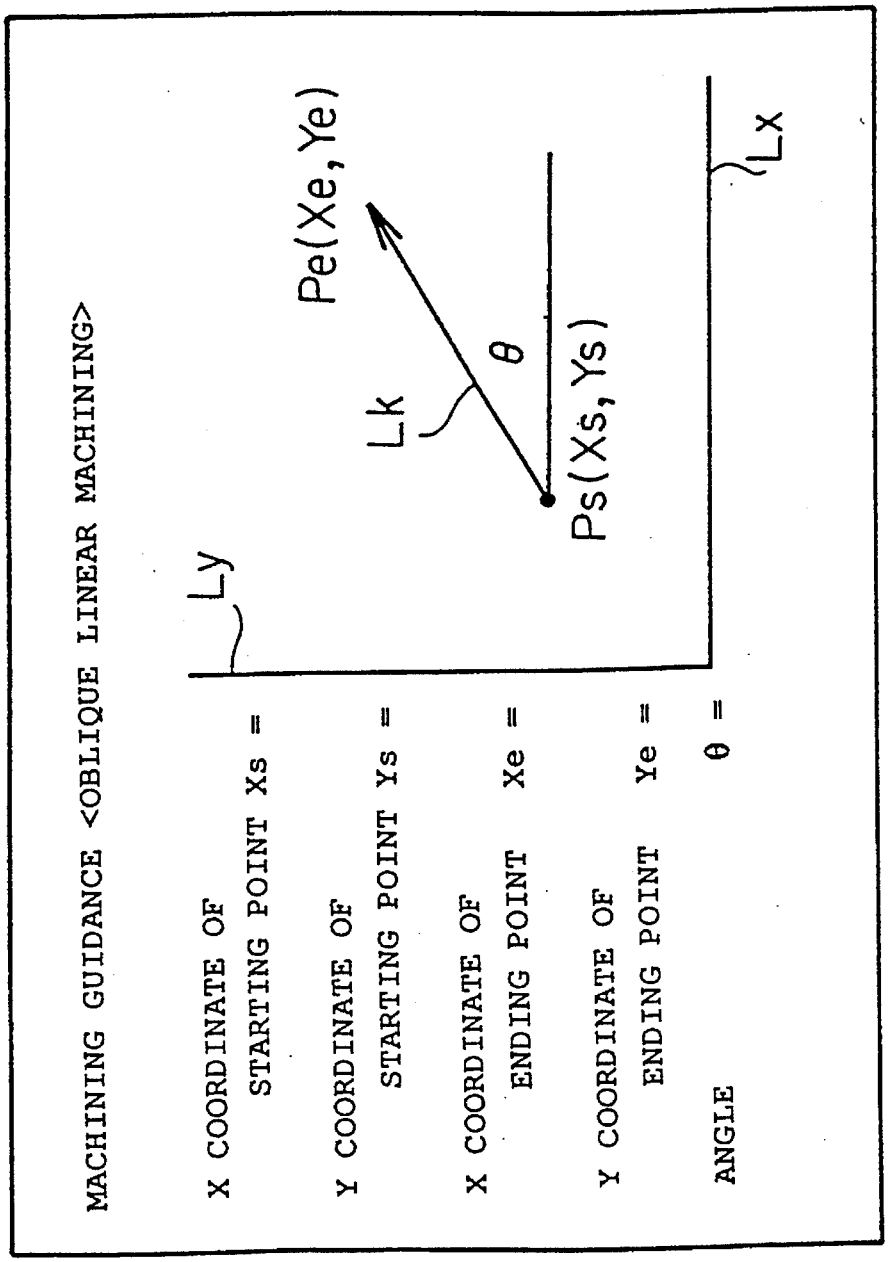
FIG. 4 is a view showing a screen display image of machining guidance for oblique linear machining.

The guidance function for the oblique linear machining will be described below. FIG. 4 shows a screen display image of machining guidance for oblique linear machining.

According to a first method, the operator designates the coordinates (Xs, Ys) of a staffing point Ps and the coordinates (Xe, Ye) of an ending point Pe. However, since no coordinates are available, unlike an ordinary numerical control apparatus, distances from planes of a workpiece that have already been machined are used as those coordinates. For example, planes that have already been machined are indicated by Lx, Ly (Lx and Ly indicate planes which are perpendicular to the paper and pass through Lx and Ly, respectively), and the operator designates distances from the planes. The operator commands the coordinates of the planes Lx, Ly from the machine control panel 21 (FIG. 1) before actual oblique linear machining is carried out. More specifically, when the operator presses a Y-axis position button (not shown) at the time the plane Lx is machined, the position YP in the present position register 4 for the Y-axis is sent to the guidance function executing means 1. Similarly, when the operator presses a X-axis position button at the time the plane Ly is machined, the position XP in the present position register 3 for the X-axis is sent to the guidance function executing means 1. Now, a coordinate system of Lx, Ly shown in FIG. 4 is generated in the guidance function executing means 1. The operator then designates the coordinates (Xs, Ys) of a starting point Ps and the coordinates (Xe, Ye) of an ending point Pe with respect to the planes Lx, Ly, whereupon an oblique straight line Lk is generated in the guidance function executing means 1. When the operator presses a start button (not shown) on the machine control panel 21, the guidance function executing means 1 sends a movement command corresponding to the straight line Lk to the pulse distributing means 2. According to the supplied movement command, the pulse distributing means 2 distributes pulses for the straight line Lk.

According to a second method, it is assumed that the tool is located at a starting point Ps, and the operator presses the X- and Y-axis position buttons on the machine control panel 21 to send present positions XP, YP from the pulse distributing means 2 to the guidance function executing means 1. Then, the operator designates an ending point Pe to define a straight line Lk. The subsequent procedure is the same as the first method.

According to a third method, it is assumed that the tool is located at a starting point Ps, and the starting point Ps is recognized by the guidance function executing means 1, as with the second method. However, the operator does not designate an ending point Pe, but designates an angle θ only. The tool then moves on a straight line Lk, and the operator presses a stop button (not shown) on the machine control panel 21 to determine an ending point.

According to a fourth method, the operator designates a starting point Ps and an angle θ only, and an ending point is determined when the operator presses the stop button.

Figure 5:
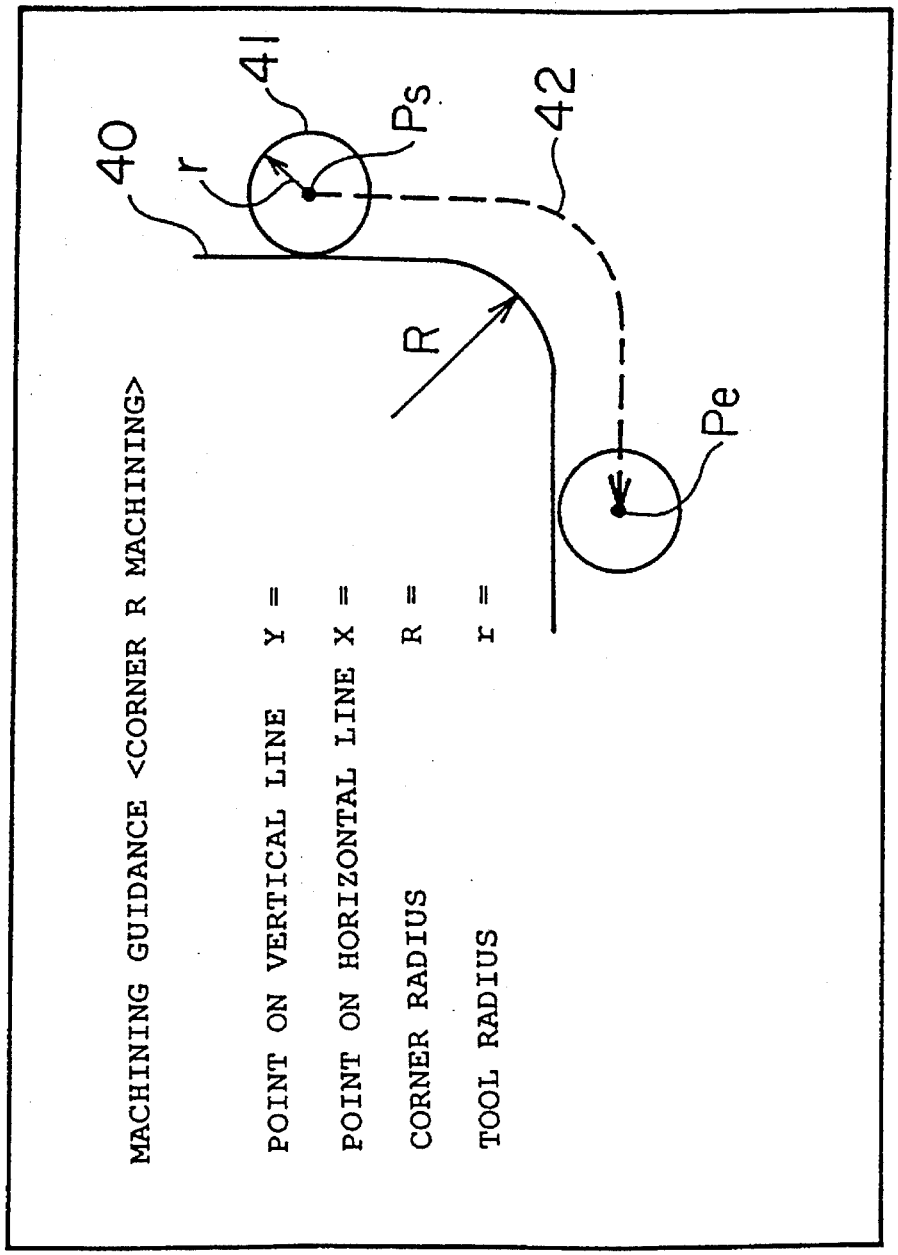
FIG. 5 is a view showing a screen display image of machining guidance for corner R machining.

The guidance function for the corner R machining will be described below. FIG. 5 shows a screen display image of machining guidance for corner R machining. First, a tool 41 is moved from the right until it actually abuts against a workpiece 40. Then, the operator presses the X- and Y-axis position buttons, whereupon a point X on a horizontal line is displayed. The tool 41 is then moved away from the workpiece 40 (at position Ps) to a position below the workpiece (below Pe), and then from below until it actually abuts against the workpiece 40 (at position Pe). The operator presses the X- and Y-axis position buttons, whereupon a point Y on a vertical line is displayed. As with the oblique linear machining, the above procedure causes the guidance function executing means 1 to recognize the positions of starting and ending points Ps, Pe for the tool.

Thereafter, the operator enters a corner radius R and a tool radius r. The guidance function executing means i calculates a machining path 42, sends a movement command to the pulse distributing means 2, which distributes pulses for the machining path 42.

Figure 6:
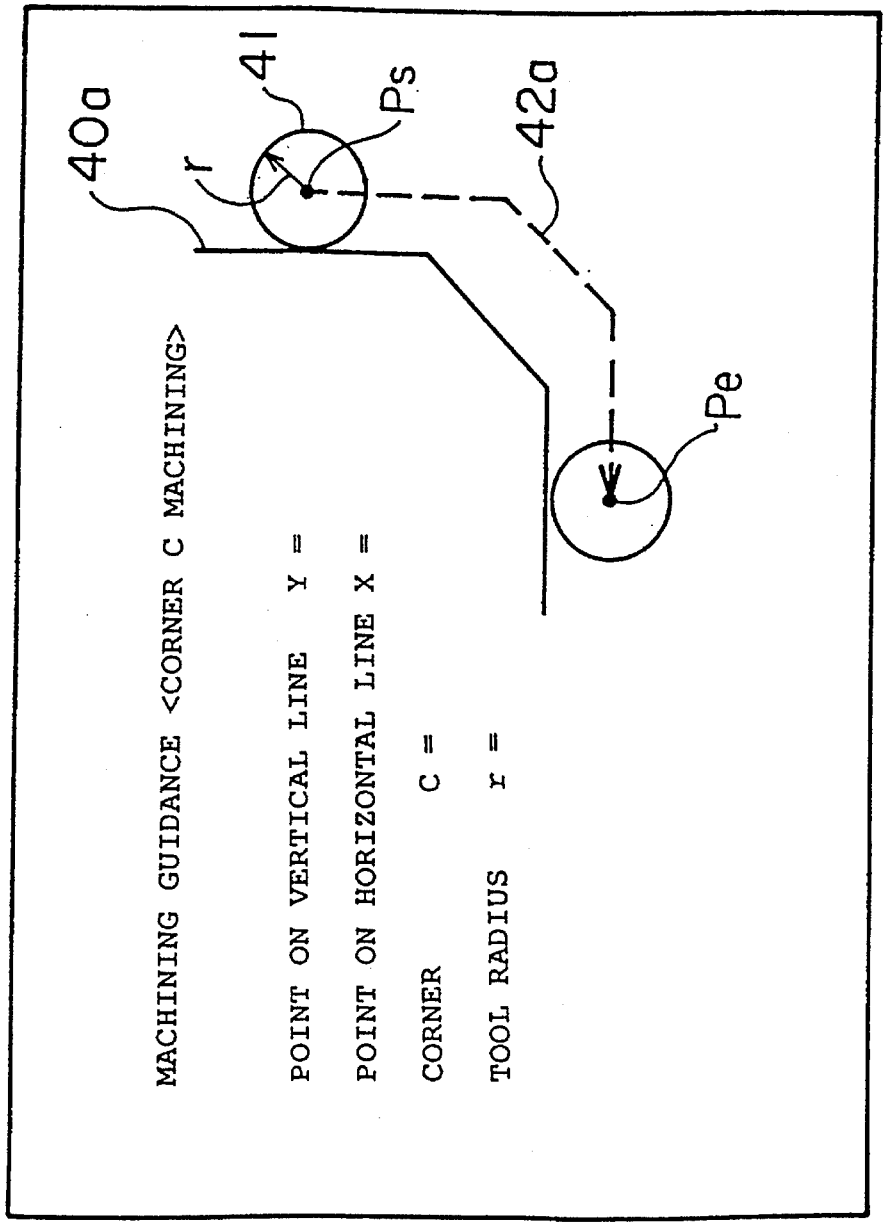
FIG. 6 is a view showing a screen display image of machining guidance for corner C machining.

The guidance function for the corner C machining will be described below. FIG. 6 shows a screen display image of machining guidance for corner C machining. The corner C machining is substantially the same as the corner R machining except that a corner C is designated instead of the corner R, the corner of a workpiece 40a has the corner C, and a machining path 42a is represented by a polygonal line. Therefore, details of the guidance function for the corner C machining will not be described below.

Figure 7:
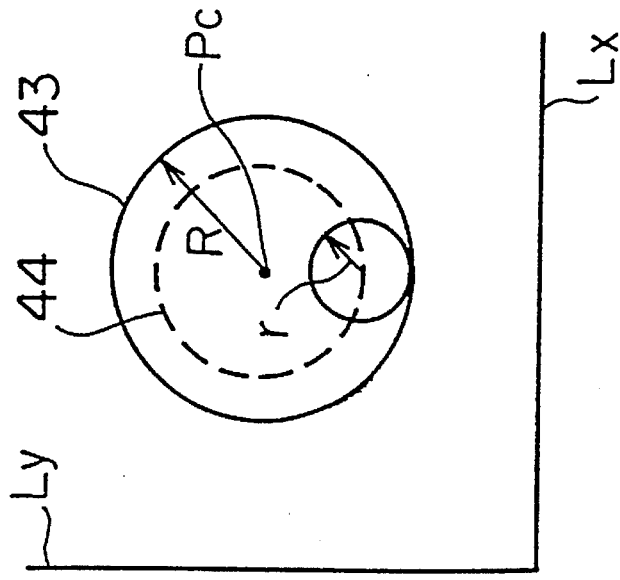
FIG. 7 is a view showing a screen display image of machining guidance for full-circle machining.

The guidance function for the full-circle machining will be described below. FIG. 7 shows a screen display image of machining guidance for full-circle machining. It is assumed that a workpiece is to be machined within a circle to a depth of Z. Planes Lx, Ly are defined in the same manner as the method described with reference to FIG. 4. The operator designates the X and Y coordinates (Xc, Yc) of the center Pc of a full circle 43, a circle radius R, a finished depth Z, and a tool radius r.

The guidance function executing means 1 calculates a machining path 44 from these designated values, and sends the calculated machining path 44 to the pulse distributing means 2, which distributes pulses for the machining path 44.

No feed speed has been referred to in the above description. However, each screen display image for machining guidance may include an item of feed speed F for the operator to designate. Alternatively, an override switch of the numerical control apparatus may be used.

Some machining guidance functions have been described above. It can readily be understood, however, that other machining guidance functions can be performed in the same manner as described above.

Consequently, when guidance information is displayed as a guidance image, the operator can define machining commands according to the displayed guidance information for easily achieving machining or the like of a portion of a prototype. The operator can thus machine a portion of a prototype or the like as if with an ordinary general-purpose milling machine, without concern over machine coordinates, a machine origin, a machining origin, and other data.

In the above description, the present invention has been described as being applied to the functions of a milling machine. However, the principles of the present invention are also applicable to the functions of a lathe or the like.

The guidance functions may be incorporated in an ordinary numerical control apparatus, or may be arranged as an especially inexpensive numerical control apparatus.

With the present invention, as described above, guidance information is displayed, and a movement command is outputted to the pulse distributing means according to command values designated by the operator. Accordingly, a portion of a prototype or the like can easily be machined as if with a general-purpose machine tool without the operator's being concerned with a coordinate system, origins, and other data.

We claim:

1. A numerical control apparatus for controlling a machine tool having at least two axes, the numerical control apparatus comprising:

pulse distributing means having a memory for storing present positions of the respective axes, wherein the respective axes correspond to surfaces of a workpiece which have been machined;

guidance function executing means for outputting guidance information with respect to a selected one of machining processes, recognizing the present positions of the respective axes from the memory, and outputting movement commands for the respective axes from command values for the respective axes and the present positions of the respective axes;

a guidance display unit for displaying said guidance information; and said pulse distributing means distributing pulses for said movement commands, to drive the machine tool.

2. The numerical control apparatus according to claim 1, wherein said pulse distributing means sends said present positions to said guidance function executing means in accordance with an external command.

3. The numerical control apparatus according to claim 1, wherein said guidance information includes machining process selecting information for selecting types of the machining processes.

4. The control apparatus according to claim 1, wherein the machining processes include at least one of oblique linear machining, corner R machining, and corner C machining processes.

5. A method of controlling a machine tool, using a numerical control apparatus, to perform operations on a workpiece, the method comprising:

determining and storing a planar first surface and a planar second surface perpendicular to the first surface, at which respective operations on a workpiece have been performed;

generating a coordinate system using the first and second surfaces as respective axes;

designating a starting point and ending point of the machine tool based upon the coordinate system; and moving the machine tool based upon the starting and ending points.

6. The method as claimed in claim 5, wherein the designating step is performed by a user.

7. The method as claimed in claim 5, wherein the designating step comprises:

using a present position of the machine tool as the starting point; and designating the ending point by a user.

8. A method of controlling a machine tool, using a numerical control apparatus, to perform operations on a workpiece, the method comprising:

determining and storing a surface at which an operation on a workpiece has been performed;

using a present position of the machine tool as a starting point of the machine tool; and designating, by a user, an angle from the surface with the starting point as a vertex;

moving the machine tool in a direction from the starting point and in a direction of the angle;

designating a desired point by the user as an ending point of the machine tool when the machine tool has reached the desired point; and moving the machine tool based upon the starting and ending points.

9. A method of controlling a machine tool, using a numerical control apparatus, to perform operations on a workpiece, the method comprising:

determining and storing a surface at which an operation on a workpiece has been performed;

designating, by a user, both a present position of the machine tool as a starting point of the machine tool and an angle from the surface with the starting point as a vertex;

moving the machine tool in a direction from the starting point and in a direction of the angle;

designating a desired point by the user as an ending point of the machine tool when the machine tool has reached the desired point; and moving the machine tool based upon the starting and ending points.

10. A method of controlling a machine tool, using a numerical control apparatus, to perform operations on a workpiece, the method comprising:

determining and storing a surface at which an operation on a workpiece has been performed;

determining and storing an additional surface, perpendicular to the surface, at which an additional operation on the workpiece has been performed;

moving the machine tool in a first direction until the machine tool contacts the surface of the workpiece, and designating the position of contact between the machine tool and the surface of the workpiece as the starting point, moving the machine tool from the starting point to another position facing the additional surface;

moving the machine tool in a second direction perpendicular to the first direction until the machine tool contacts the additional surface of the workpiece, and designating the position of contact between the machine tool and the additional surface of the workpiece being the ending point;

designating a moving path of the machine tool based upon the starting and ending points; and moving the machine tool based upon the starting and ending points.

11. A method of controlling a machine tool, using a numerical control apparatus, to perform operations on a workpiece, the method comprising:

determining and storing a first surface and a second surface perpendicular to the first surface, at which respective operations on a workpiece have been performed;

generating a coordinate system using the first and second surfaces as respective axes;

designating a starting point and ending point of the machine tool based upon the coordinate system;

designating a moving path of the machine tool based upon the starting and ending points; and moving the machine tool based upon the moving path.

12. The method as claimed in claim 11, further comprising:

designating a radius of the machine tool and a corner configuration of a corner formed by the first and second surfaces using the coordinate system; and said designation of the moving path also being based upon the radius and the corner configuration.

13. The method as claimed in claim 11, further comprising:

designating a tool radius of the machine tool, a circle radius of a radial cut to be made in the workpiece and a depth of the radial cut using the coordinate system; and said designation of the moving path also being based upon the tool radius, the circle radius, and the depth.

* * * * *

UNITED STATES PATENT AND TRADEMARK OFFICE
CERTIFICATE OF CORRECTION

PATENT NO. : 5,583,409
DATED : December 10, 1996
INVENTOR(S) : Mitsuo KURAKAKE, et al.

It is certified that error appears in the above-indentified patent and that said Letters Patent is hereby corrected as shown below:

<u>Column 1</u>

Line 11, "more particularly to" should be --more particularly, to--.

Line 28, "numerical a control" should be --numerical control--.

<u>Column 5</u>

Line 12, "means i calculates" should be --means 1 calculates--.

Signed and Sealed this

First Day of April, 1997

Attest:

BRUCE LEHMAN

*Attesting Officer*  *Commissioner of Patents and Trademarks*